United States Patent
Azarian Yazdi et al.

(10) Patent No.: US 10,524,259 B2
(45) Date of Patent: *Dec. 31, 2019

(54) HIGH RELIABILITY LOW LATENCY MISSION CRITICAL COMMUNICATION

(71) Applicant: QUALCOMM Incorporated, San Diego, CA (US)

(72) Inventors: Kambiz Azarian Yazdi, San Diego, CA (US); Tingfang Ji, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,406

(22) Filed: Mar. 9, 2018

(65) Prior Publication Data

US 2018/0199340 A1 Jul. 12, 2018

Related U.S. Application Data (63) Continuation of application No. 14/836,740, filed on Aug. 26, 2015, now Pat. No. 9,936,498.

(Continued)

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/0018* (2013.01); *H04L 1/0026* (2013.01);
(Continued)

(58) Field of Classification Search
CPC ......... H04W 72/0446; H04W 72/0453; H04W 72/14; H04B 1/74
See application file for complete search history.

(56) References Cited

U.S. PATENT DOCUMENTS 9,936,498 B2 * 4/2018 Azarian Yazdi .. H04W 72/0446
9,961,096 B1 * 5/2018 Pierce ................. H04L 63/1425
(Continued)

FOREIGN PATENT DOCUMENTS

CN 101227226 A 7/2008
CN 101291192 A 10/2008
(Continued)

OTHER PUBLICATIONS

Motorola: "E-UTRA TTI Size and Number of TTIs," 3GPP TSG-RAN WG1#46 R1-062058, 3GPP, Aug. 23, 2006, pp. 1-8.
(Continued)

*Primary Examiner* — Benjamin H Elliott, IV
(74) *Attorney, Agent, or Firm* — Haynes and Boone, LLP (57) ABSTRACT

Systems and methods for communicating mission-critical (MiCri) data in a network including a base station and user equipment (UE) are provided. The methods may include receiving a request message requesting MiCri data, and transmitting the MiCri data during a transmission time interval (TTI) of a first carrier component or during a transmission time interval (TTI) of a second carrier component. In various aspects, the TTI of the first carrier component may be staggered in time with respect to the TTI of the second carrier component. In another aspect, the UE may pre-report interference pattern information for a nominal TTI for use in communication of MiCri data.

30 Claims, 7 Drawing Sheets

Related U.S. Application Data (60) Provisional application No. 62/075,099, filed on Nov. 4, 2014.

(51) Int. Cl.
*H04L 1/00* (2006.01)
*H04L 5/00* (2006.01)
*H04W 88/08* (2009.01)

(52) U.S. Cl.
CPC .......... *H04L 1/1812* (2013.01); *H04L 1/1887* (2013.01); *H04L 5/001* (2013.01); *H04L 5/0055* (2013.01); *H04L 5/0091* (2013.01); *H04W 72/0453* (2013.01); *H04L 5/0094* (2013.01); *H04L 5/0098* (2013.01); *H04W 88/08* (2013.01)

(56) References Cited

U.S. PATENT DOCUMENTS

| | | |
|---|---|---|
| 2008/0287124 A1 | 11/2008 | Karabinis |
| 2009/0060081 A1* | 3/2009 | Zhang .................. H04L 1/0026 375/267 |
| 2012/0163486 A1 | 6/2012 | Yim et al. |
| 2012/0182958 A1 | 7/2012 | Pelletier et al. |
| 2012/0236804 A1 | 9/2012 | Lunttila et al. |
| 2012/0320853 A1 | 12/2012 | Kwon et al. |
| 2013/0182569 A1 | 7/2013 | Bertrand et al. |
| 2013/0329701 A1 | 12/2013 | Bajzec et al. |
| 2014/0071954 A1 | 3/2014 | Au et al. |
| 2015/0156778 A1 | 6/2015 | Roessel et al. |
| 2015/0215082 A1 | 7/2015 | Agiwal et al. |
| 2015/0341934 A1 | 11/2015 | Sorrentino et al. |
| 2016/0128060 A1 | 5/2016 | Azarian et al. |
| 2017/0005758 A1 | 1/2017 | Baldemair et al. |
| 2018/0199340 A1* | 7/2018 | Azarian Yazdi .. H04W 72/0446 |

FOREIGN PATENT DOCUMENTS

| | | |
|---|---|---|
| CN | 102447538 A | 5/2012 |
| JP | 2001510959 A | 8/2001 |
| JP | 2007124127 A | 5/2007 |
| JP | 2009188660 A | 8/2009 |
| WO | 9904538 A1 | 1/1999 |
| WO | 2016073138 A1 | 5/2016 |

OTHER PUBLICATIONS

ST-Ericsson: "Further discussion on UE-supported DRX Configuration," 3GPP TSG-RAN WG2# 77bis R2-121517, 3GPP, Mar. 19, 2012, pp. 1-5.

International Search Report and Written Opinion—PCT/US2015/054978—ISA/EPO—dated Jan. 11, 2016.

Lu Y., et al., "Uplink Control for Low Latency HARQ in TDD Carrier Aggregation", Vehicular Technology Conference (VTC Spring), 2012 IEEE 75th, IEEE, May 6, 2012 (May 6, 2012), pp. 1-5, XP032202607, DOI: 10.1109/VETECS.2012.6240190, ISBN: 978-1-4673-0989-9, abstract Section I; p. 1.

* cited by examiner

HIGH RELIABILITY LOW LATENCY MISSION CRITICAL COMMUNICATION

CROSS REFERENCE TO RELATED APPLICATIONS

The present application is a continuation application of U.S. Non-Provisional patent application Ser. No. 14/836,740, filed Aug. 26, 2015, which claims priority to and the benefit of the U.S. Provisional Patent Application No. 62/075,099, filed Nov. 4, 2014, which are hereby incorporated by reference in their entirety.

TECHNICAL FIELD

The present disclosure relates to communication networks, and more particularly to communicating mission-critical (MiCri) data among the elements of the communication networks with high reliability and low latency.

BACKGROUND

Communication networks include elements such as base stations and wireless communication devices. Both the base stations and the user equipments include transceivers that allow the base stations and the user equipments to wirelessly communicate, i.e., to transmit and to receive, data in the communication network. When the base stations and user equipments wirelessly communicate mission-critical (MiCri) data, such communications are required to be highly reliable and the error rate associated with such communications is required to be very low. For example, a block error rate (BLER) of about $1e^{-4}$ is required for communication of the MiCri data. In addition, such communications are required to be completed with low latency. The present disclosure proposes systems and methods to accomplish the above described high reliability low latency (HRLL) mission-critical data communication.

The MiCri data may be associated with mission-critical applications being used by mission-critical user equipments. One example of a mission-critical user equipment is a driverless vehicle being driven electronically without human input. The driverless vehicle may frequently request MiCri data to learn information regarding other vehicles on the road, traffic patterns, and the like, allowing the driverless vehicle to keep track of its position and be able to react accordingly while on the road. As can be appreciated, the driverless vehicles should be able to receive the requested MiCri data with high reliability and low latency to ensure proper operation and to avoid accidents. Another example of a mission-critical user equipment is a merger unit in an energy system. The merger unit is responsible for collecting and evaluating high-frequency data associated with measured voltage/current values to predict any abnormal conditions that may occur within the energy system, and quickly communicate instruction data to the appropriate unit of the energy system to allow the abnormal condition to be avoided. Again, as can be appreciated, the merger unit should be able to communicate MiCri data such as the high-frequency data associated with the measured voltage/current values and the instruction data with high reliability and low latency to avoid the abnormal condition. As can be appreciated, the present disclosure is applicable to any MiCri data, situations, and applications.

SUMMARY

In one aspect, the present disclosure proposes a method for wireless communication, the method including receiving, at a first device, a request message from a second device requesting mission critical (MiCri) data; and transmitting, from the first device, the MiCri data to the second device during a transmission time interval (TTI) of a first carrier component or during a transmission time interval (TTI) of a second carrier component, the TTI of the first carrier component being staggered in time with respect to the TTI of the second carrier component.

In one aspect, the present disclosure proposes a method for wireless communication, the method including transmitting, from a first device, a reference signal to a second device during a first transmission time interval (TTI) of a carrier component; receiving, at the first device, an indication of an interference pattern experienced by the second device for a duration of the first TTI, the indication being based on the reference signal; and transmitting, from the first device, MiCri data to the second device during the first TTI of the carrier component using a hybrid automated repeat request (HARQ) block based on the indication.

In one aspect, the present disclosure proposes a method for wireless communication, the method including transmitting, to a first device from a second device, a request message requesting mission critical (MiCri) data; and receiving, at the second device, the MiCri data from the first device during a transmission time interval (TTI) of a first carrier component or during a transmission time interval (TTI) of a second carrier component, the TTI of the first carrier component being staggered in time with respect to the TTI of the second carrier component.

In one aspect, the present disclosure proposes a method for wireless communication, the method including receiving, from a first device at a second device, a reference signal during a first transmission time interval (TTI) of a carrier component; transmitting, from the second device, an indication of an interference pattern experienced by the second device based on the reference signal; and receiving, at the second device, MiCri data from the base station during the first TTI of the carrier component using a hybrid automated repeat request (HARQ) block based on the indication.

In one aspect, the present disclosure proposes a base station including a receiver configured to receive a request message from a first device requesting mission critical (MiCri) data; and a transmitter configured to transmit the MiCri data to the first device during a transmission time interval (TTI) of a first carrier component or during a transmission time interval (TTI) of a second carrier component, wherein the TTI of the first carrier component is staggered in time with respect to the TTI of the second carrier component.

In one aspect, the present disclosure proposes a base station including a transmitter configured to transmit a reference signal to a first device during a first transmission time interval (TTI) of a carrier component; a receiver configured to receive an indication of an interference pattern experienced by the first device for a duration of the first TTI, the indication being based on the reference signal, wherein the transmitter is configured to transmit MiCri data to the first device during the first TTI of the carrier component using a hybrid automated repeat request (HARQ) block based on the indication.

In one aspect, the present disclosure proposes a user equipment (UE) including a transmitter configured to transmit a request message to a first device requesting mission critical (MiCri) data; and a receiver configured to receive the MiCri data from the first device during a transmission time interval (TTI) of a first carrier component or during a transmission time interval (TTI) of a second carrier component, wherein the TTI of the first carrier component is staggered in time with respect to the TTI of the second carrier component.

In one aspect, the present disclosure proposes a user equipment (UE) including a receiver configured to receive a reference signal from a first device during a first transmission time interval (TTI) of a carrier component; a transmitter configured to transmit an indication of an interference pattern experienced by the UE based on the reference signal, wherein the receiver is configured to receive MiCri data from the first device during the first TTI of the carrier component using a single hybrid automated repeat request (HARQ) block based on the indication.

In one aspect the present disclosure proposes a wireless communication network including means for receiving a request message from a first device requesting mission critical (MiCri) data; and means for transmitting the MiCri data to the first device during a transmission time interval (TTI) of a first carrier component or during a transmission time interval (TTI) of a second carrier component, the TTI of the first carrier component being staggered in time with respect to the TTI of the second carrier component.

In one aspect the present disclosure proposes a wireless communication network including means for transmitting a reference signal to a first device during a first transmission time interval (TTI) of a carrier component; means for receiving an indication of an interference pattern experienced by the first device for a duration of the first TTI, the indication being based on the reference signal, wherein the means for transmitting transmits MiCri data to the first device during the first TTI of the carrier component using a single hybrid automated repeat request (HARQ) block based on the indication.

In one aspect the present disclosure proposes a wireless communication network including means for transmitting a request message to a first device requesting mission critical (MiCri) data; and means for receiving the MiCri data from the base station during a transmission time interval (TTI) of a first carrier component or during a transmission time interval (TTI) of a second carrier component, the TTI of the first carrier component being staggered in time with respect to the TTI of the second carrier component.

In one aspect the present disclosure proposes a wireless communication network including means for receiving a reference signal from a first device during a first transmission time interval (TTI) of a carrier component; and means for transmitting an indication of an interference pattern experienced by a second device based on the reference signal, wherein the means for receiving receives MiCri data from the base station during the first TTI of the carrier component using a single hybrid automated repeat request (HARQ) block based on the indication.

In one aspect the present disclosure proposes a computer readable medium having program code recorded thereon, the program code including code for causing a computer operating in a network to receive a request message from a first device requesting mission critical (MiCri) data; and code for causing the computer operating in the network to transmit the MiCri data to the first device during a transmission time interval (TTI) of a first carrier component or during a transmission time interval (TTI) of a second carrier component, the TTI of the first carrier component being staggered in time with respect to the TTI of the second carrier component.

In one aspect the present disclosure proposes a computer readable medium having program code stored thereon, the program code including code for causing a computer operating in a network to transmit a reference signal to a first device during a first transmission time interval (TTI) of a carrier component; code for causing the computer operating in the network to receive an indication of an interference pattern experienced by the first device for a duration of the first TTI, the indication being based on the reference signal; and code for causing the computer operating in the network to transmit MiCri data to the first device during the first TTI of the carrier component using a hybrid automated repeat request (HARQ) block that accounts for the interference pattern experienced by the first device during the first TTI of the carrier component.

In one aspect the present disclosure proposes a computer readable medium having program code stored thereon, the program code including code for causing a computer operating in a network to transmit a request message to a first device requesting mission critical (MiCri) data; and code for causing the computer operating in the network to receive the MiCri data from the first device during a transmission time interval (TTI) of a first carrier component or during a transmission time interval (TTI) of a second carrier component, the TTI of the first carrier component being staggered in time with respect to the TTI of the second carrier component.

In one aspect the present disclosure proposes a computer readable medium having program code recorded thereon, the program code including code for causing a computer operating in a network to receive a reference signal from a first device during a first transmission time interval (TTI) of a carrier component; code for causing the computer operating in the network to transmit an indication of an interference pattern experienced by the UE based on the reference signal; and code for causing the computer operating in the network to receive MiCri data from the first device during the first TTI of the carrier component using a hybrid automated repeat request (HARQ) block based on the indication.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As discussed above, mission-critical applications require that MiCri data be communicated with high reliability and low latency. This application proposes systems and methods to accomplish communication of such high reliability low latency (HRLL) MiCri data and high reliability moderate latency (HRML) MiCri data. In this regard, HRLL MiCri data includes data requiring low error rates (e.g., a BLER less than $1e^{-3}$, $1e^{-4}$, or smaller) and very short latency times (e.g., having a HARQ roundtrip time (RTT) less than 200 μs, 100 μs, or shorter), while HRML MiCri data includes data requiring similarly low error rates, but with slightly longer latency times (e.g., having a HARQ RTT less than 5 ms, 3 ms, 1 ms, or shorter).

Figure 1:
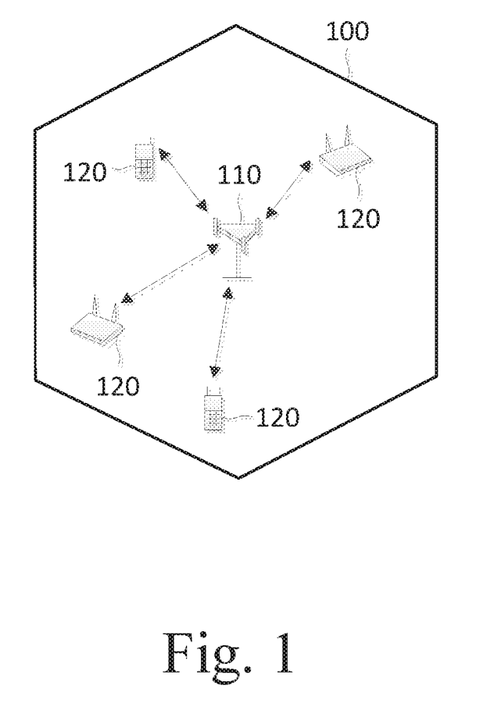
FIG. 1 illustrates a communication network 100 according to an aspect of the present disclosure.

FIG. 1 illustrates a communication network 100 according to various aspects of the present disclosure. The communication network 100 may include elements such as base stations 110 and wireless communication devices 120 in communication with each other. A base station 110 may include an evolved Node B (eNodeB) in the LTE context, for example. A base station 110 may also be referred to as a base transceiver station or an access point. A wireless communication device 120 may be referred to as a user equipment (UE). The wireless communication devices 120 may be dispersed throughout the communication network 100, and may be stationary or mobile. A wireless communication device 120 may also be referred to as a terminal, a mobile station, a subscriber unit, and the like. A wireless communication device 120 may be a cellular phone, a smartphone, a personal digital assistant, a wireless modem, a laptop computer, a tablet computer, and the like. The communication network 100 is one example of a network to which various aspects of the disclosure apply.

The techniques described herein may be used for various wireless communication networks such as CDMA, TDMA, FDMA, OFDMA, SC-FDMA and other networks. The terms "network" and "system" are often used interchangeably. A CDMA network may implement a radio access technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio access technology such as Global System for Mobile Communications (GSM). An OFDMA network may implement a radio access technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio access technologies mentioned above as well as other wireless networks and radio technologies, such as a next generation (e.g., $5^{th}$ Generation (5G)) network.

The communication among the base stations 110 and the wireless communication devices 120 may be carried out over one or more carrier components (CCs). Each carrier component (CC) may carry control data, user data, or both (generally referred to as data). For example, a base station 110 may transmit data to a wireless communication device 120 via one or more downlink control carrier components and via one or more downlink data carrier components. A wireless communication device 120 may transmit data to a base station 110 via one or more uplink control carrier components and via one or more uplink data carrier components.

Figure 2:
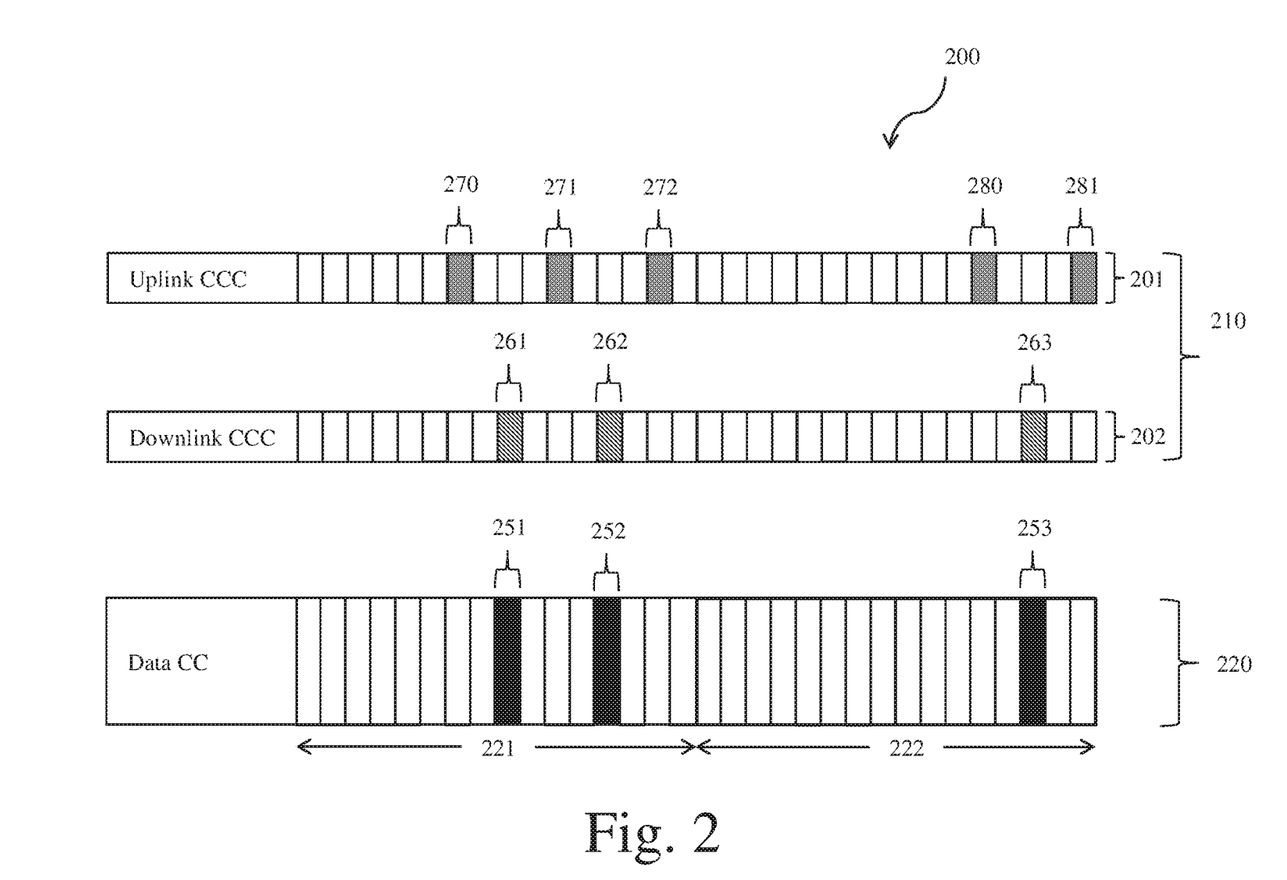
FIG. 2 illustrates an exemplary configuration 200 of a communication network according to as aspect of the present disclosure.

FIG. 2 illustrates an exemplary configuration 200 of a control carrier component 210 and a data carrier component 220 according to various aspects of the present disclosure. The control carrier component 210 includes an uplink control carrier component 201 and a downlink control carrier component 202. As can be appreciated, each of the uplink and the downlink components may have one or more component carriers (CCs), and each component carrier may be able to carry control, data, or both.

Returning to FIG. 2, the data carrier component (Data CC) 220 may be divided into nominal transmission time intervals (TTIs) 221, 222, each of which may be further divided into thinner time intervals of time referred to herein as thin-TTIs. Similar to the data carrier component 220, each of the uplink control carrier component (Uplink CCC) 201 and the downlink control carrier component (Downlink CCC) 202 may be divided into thin-TTIs, as shown in FIG. 2. The base station 110 may divide user data to be transmitted to various wireless communication devices 120 into blocks, and may transmit these blocks of data to the wireless communication devices 120 over the data carrier component 220 during nominal TTIs 221, which are further divided into thin-TTIs. The base station 110 may transmit control data to respective wireless communication devices 120 during the thin-TTIs of the downlink control carrier component. Similarly, respective wireless communication devices 120 may transmit control data to the base station 110 during the thin-TTIs of the uplink control carrier component. According to various aspects of the present disclosure, a nominal TTI 220 may have a duration of about 200-400 μs while a thin-TTI may have a duration of about 25 μs. For example, in FIG. 2, the nominal TTI has a duration of 400 μs and is divided into 16 thin-TTIs, each thin-TTI having a duration of 25 μs. However, each nominal TTI may be divided into any number of thin-TTIs.

As discussed above, when a wireless communication device 120 is involved in a mission-critical application, the wireless communication device 120 needs to be able to receive the MiCri data with high reliability and low latency. To achieve compliance with the required high reliability and low latency, a base station 110 may transmit the MiCri data to the wireless communication device 120 by transmitting hybrid automated repeat request (HARQ) blocks over the data carrier component. For example, the base station 110 may receive, over the uplink control carrier component 201, a request message 270 during a thin-TTI 222 over the uplink control carrier component 201 from the wireless communication device 120 requesting MiCri data. In response to receiving the request message 270, the base station 110 may transmit, over the downlink control carrier component 202, a grant message 261 indicating to the wireless communication device 120 that the request for the MiCri data has been granted. The grant message 261 may also include an assignment of downlink resources on which the MiCri data will be transmitted. Further, the base station 120 may transmit, over the data carrier component 220, a first HARQ block 251 during a thin-TTI 222 within a present nominal TTI 221.

The wireless communication device 120 may receive the transmitted first HARQ block 251, and run a cyclic redundancy check (CRC) to detect transmission errors associated with the transmission of the first HARQ block. If the CRC detects that the transmission is in compliance with the high reliability and low latency requirements, then the wireless communication device 120 may transmit, over the uplink control carrier component 201, an acknowledgment message 371 indicating satisfactory reception of the MiCri data received in the form of the first HARQ block. However, if the CRC detects transmission errors in violation of the high reliability and low latency requirements, the wireless communication device 120 may transmit, over the uplink control carrier component 201, a negative acknowledgment message 371 indicating unsatisfactory reception of the MiCri data. In the negative acknowledgment message 371, the wireless communication device 120 may also indicate the interference pattern experienced by the wireless communication device 120 during the present nominal TTI 221.

Upon receiving the negative acknowledgment message 271, the base station 110 may transmit a second HARQ block 252 to complete communication of the MiCri data. Further, the base station 110 may transmit the second HARQ block 252 by taking into account the interference pattern indicated as being experienced by the wireless communication device 120 during the present nominal TTI 221. Because the transmission of the second HARQ block 252 takes into account the interference pattern experienced during the present normal TTI, this transmission should ensure that the second HARQ block 252 may be received by the wireless communication device 120 in compliance with the high reliability and low latency requirements. Finally, the base station 110 should receive an acknowledgment message 272 indicating satisfactory reception of the MiCri data in the form of the second HARQ block 252.

However, this may be true when the second HARQ block is also transmitted and received during the present nominal TTI 221. This is because, due to the changing carrier component conditions and other interfering activity conducted by neighboring base stations and wireless communication devices, the interference patterns experienced by the wireless communication device 120 during two separate nominal TTIs 221, 222 are different with respect to each other. That is, the interference pattern experienced by the wireless communication device 120 during the present nominal TTI 221 is different from the interference pattern experienced by the wireless communication device 120 during the next nominal TTI 222. Therefore, to ensure that the MiCri data may be received by the wireless communication device 120 in compliance with the high reliability and low latency requirements, the base station 110 should ensure that both the first HARQ block 251 and the second HARQ block 252 are transmitted and received during a common nominal TTI.

However, it may not be possible for the base station 110 to ensure that the first HARQ block 251 and the second HARQ block 252 are transmitted and received during a common nominal TTI. For example, as shown in FIG. 2, once the base station 110 transmits an HARQ block, the base station 110 receives the acknowledgment message or the negative acknowledgment message within, for example, two thin-TTIs from the transmission of the HARQ block. Subsequently, when the base station 110 receives the negative acknowledgment, the base station 110 is able to transmit the second HARQ block within another, for example, two thin-TTIs from the reception of the negative acknowledgment. As such, as seen in the figures, the time period required for transmissions of the first HARQ block and the second HARQ block is, for example, five thin-TTIs. As can be appreciated, the above predetermined response time periods of two thin-TTIs and five thin-TTIs are exemplary, and may vary from communication network to communication network. A communication network may determine predetermined threshold time periods, and ensure that the first HARQ block 251 and the second HARQ block 252 are transmitted and received during a common nominal TTI accordingly.

During this time period, the duration of the present nominal TTI may end, and the base station 110 may have to transmit the second HARQ block during the next nominal TTI. As discussed below, such transmission of the second HARQ block may not ensure compliant reception of the MiCri data even when the transmission of the second HARQ block takes into account the interference pattern experienced by the wireless communication device 120 during the present nominal TTI. This is because the interference pattern experienced by the wireless communication device 120 during the present nominal TTI is different from the interference pattern experienced by the wireless communication device 120 during the next nominal TTI in which the second HARQ block was transmitted and received. In this way, communication of the MiCri data may fail.

For example, the base station 110 may receive a request message 280 from the wireless communication device 120 towards the latter part of a nominal TTI (e.g., TTI 222). In this case, the base station 110 may transmit a grant message 263 and a first HARQ block 253 during the first available thin-TTI within the present nominal TTI 222, and wait to receive the acknowledgment message or the negative acknowledgment message 281 from the wireless communication device 120 prior to transmitting the second HARQ block. As seen in FIG. 2, when the base station 110 receives an acknowledgment message 281, no further action with respect to transmission of the MiCri data is necessary because the acknowledgment message 281 indicates satisfactory reception of the MiCri data in the form of the first HARQ block 253. However, when the base station 110 receives a negative acknowledgment message 281, it is difficult to ensure satisfactory reception of the MiCri data. This is because, during this time period, the duration of the present nominal TTI 222 has ended, and the base station 110 will have to transmit the second HARQ block 265 (not shown) during the next nominal TTI 223 (not shown). As discussed above, such transmission of the second HARQ block 265 may not ensure compliant reception of the MiCri data even when the transmission of the second HARQ block 265 takes into account the interference pattern experienced by the wireless communication device 120 during the present nominal TTI 222. This is because the interference pattern experienced by the wireless communication device 120 during the present nominal TTI 222 is different from the interference pattern experienced by the wireless communication device 120 during the next nominal TTI 223 in which the second HARQ block 265 would be transmitted and received. In this way, communication of the MiCri data may fail.

The present disclosure proposes methods and systems to avoid the above described failure during communication of the MiCri data. According to various aspects, the present disclosure proposes including a second data carrier component in addition to the first data carrier component. Further, the present disclosure proposes staggering in time the nominal TTIs of the second data carrier component with respect to the nominal TTIs of the first data carrier component. Such a configuration is illustrated in FIG. 3.

Figure 3:
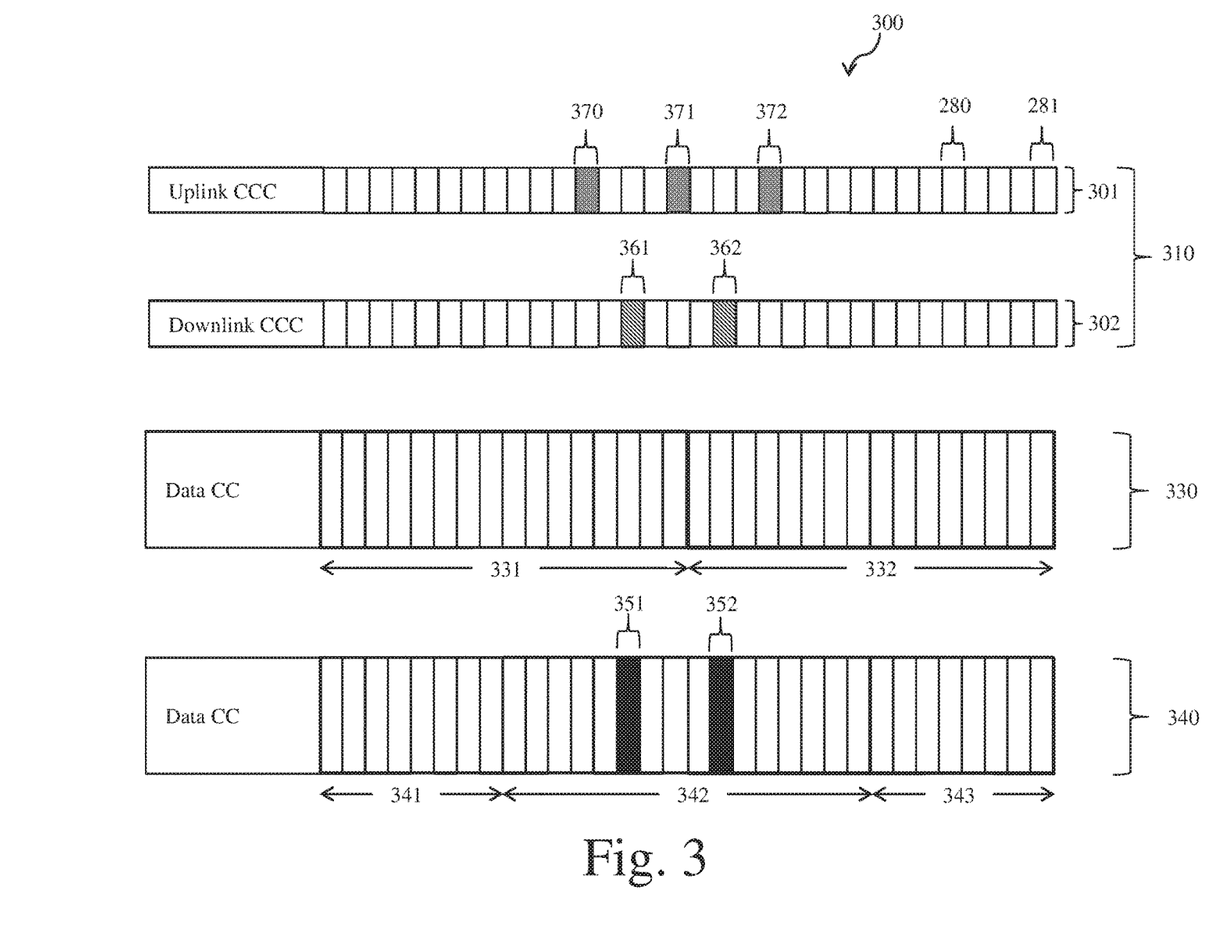
FIG. 3 illustrates an exemplary configuration 300 of a communication network according to an aspect of the present disclosure.

FIG. 3 illustrates another exemplary configuration of a communication network 300 according to various aspects of the present disclosure. The communication network 300 includes base stations 110 and wireless communication devices 120 in communication with each other. The control carrier component 310 includes an uplink control carrier component 301 and a downlink control carrier component 302. The wireless communication devices 120 may transmit control data to the base stations 110 over thin-TTIs of the uplink control carrier component 301, and the base stations 110 may transmit control data to the wireless communication devices 120 over thin-TTIs of the downlink control carrier component 302. Further, the base stations 110 may transmit user data, including MiCri data, to the wireless communication devices 120 over the first data carrier component 330 and/or over the second data carrier component 340. The first data carrier component 330 and the second data carrier component 340 may be included in a common transmission (frequency) band, or maybe part of different transmission (frequency) bands. Also, the uplink control carrier component 301 and the downlink control carrier component 302 may be included in a common transmission (frequency) band, or maybe part of different transmission (frequency) bands, including partially overlapping or completely separate transmission bads. The first data carrier component 330 includes nominal TTIs 331, 332 and the second data carrier component 340 includes nominal TTIs 341, 342, 343 (only portions of TTIs 341, 343 are shown). As shown in FIG. 3, the nominal TTIs 331, 332 are staggered in time with respect to the nominal TTIs 341, 342, 343. In various aspects, the staggering in time may be by a predetermined fractional amount (e.g., 25%, 33%, 50%, etc.) of a time length of the nominal TTI. Further, in various aspects, the predetermined amount may be different for different communication networks.

Figure 4:
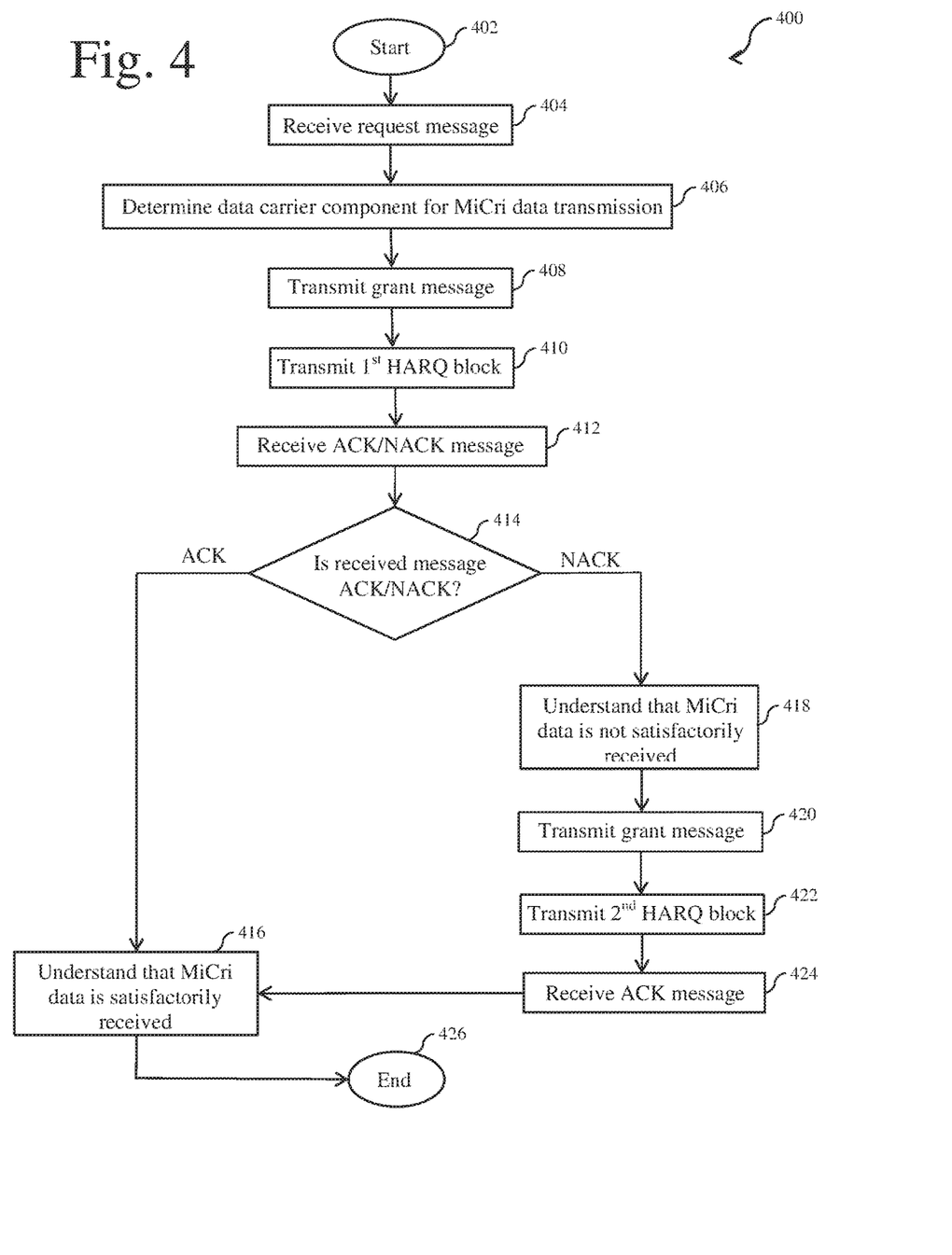
FIG. 4 illustrates a method 400 according to an aspect of the present disclosure.

A method 400 according to an aspect of the present disclosure to avoid the previously discussed failure during communication of the MiCri data will now be described. FIG. 4 illustrates the method 400 utilizing the network configuration 300 illustrated in FIG. 3 according to an aspect of the present disclosure. The method starts at step 402.

At step 404, the base station 110 receives a request message 370 from the wireless communication device 120 requesting MiCri data. The base station 110 may receive the request message over a thin-TTI of the uplink control carrier component 301.

At step 406, in response to receiving the request message 370, the base station 110 determines which data carrier component, from among the first data carrier component 330 and the second data carrier component 340, to use to transmit the first HARQ block 351. In various aspects, the base station 110 may make this determination based on a timing of the request message 371. For example, as shown in FIG. 3, when the request message 371 is received during a latter part of the present normal TTI 331, the base station 110 may determine that it may not be possible to transmit both the first HARQ block 351 and the second HARQ block 352 during the present nominal TTI 331 of the first data carrier component 330. For example, the base station 110 may determine that it may not be possible to transmit both the first HARQ block 351 and the second HARQ block 352 during the present nominal TTI 331 when the request message 371 is received within fewer than the predetermined threshold number of thin-TTIs remaining in the present nominal TTI 331. However, the base station 110 determines that the first HARQ block 351 and the second HARQ block 352 may be transmitted during the present nominal TTI 342 of the second data carrier component 340. Therefore, the base station determines that the first HARQ block 351 is to be transmitted during the present nominal TTI 342 of the second data carrier component 340. In summary, the base station 110 determines that the first HARQ block 351 is to be transmitted over the first data carrier component 330 when it is determined that both the first HARQ block 351 and the second HARQ block 352 may be transmitted during the present nominal TTI 331 of the first data carrier component 330. On the other hand, the base station 110 determines that the first HARQ block 351 is to be transmitted over the second data carrier component 340 when it is determined that both the first HARQ block 351 and the second HARQ block 352 may not be transmitted during the present nominal TTI 331 of the first data carrier component 330. In this way, as discussed further below, the base station 110 ensures that the MiCri data may be received by the wireless communication device 120 in compliance with the high reliability and low latency requirements.

At step 408, the base station 110 transmits a grant message 361 to the wireless communication device 120 during a thin-TTI of the downlink control carrier component 302. The grant message 361 may include information indicating that the request for the MiCri data has been granted. The grant message 361 may also include information regarding the data carrier component over which the MiCri data is to be transmitted.

At step 410, the base station 110 may transmit the first HARQ block 351 during a thin-TTI of the present nominal TTI 342 of the second data carrier component 340, as determined in step 406. The base station 110 may transmit the first HARQ block 351 substantially simultaneously or along with the grant message 361 transmitted in step 406. For example, the base station 110 may transmit the first HARQ block 351 during a thin-TTI of the present nominal TTI 342 that corresponds in time with the thin-TTI of the downlink control carrier component 302 during which the grant message 361 is transmitted. Alternatively, the first HARQ block 351 may be transmitted during a thin-TTI that does not correspond in time with the thin-TTI during which the grant message 361 is transmitted.

At step 412, the base station 110 may receive either an acknowledgment message or a negative acknowledgment message 371 from the wireless communication device 120. The base station 110 may receive the acknowledgment message or the negative acknowledgment message 371 over the uplink control carrier component 301. As previously discussed, the base station 110 may receive a negative acknowledgment message 371 including information regarding the interference pattern experienced by the wireless communication device 120 during the present nominal TTI 342. This information may include carrier component conditions and/or interference patterns experienced from communication activity of neighboring base stations and wireless communication devices.

At step 414, the base station 110 may determine whether the received message is an acknowledgment message or a negative acknowledgment message. The method proceeds to step 414 when it is determined that the acknowledgment message has been received, or the message proceeds to step 416 when it is determined that the negative acknowledgment message has been received.

At step 416, the base station 110 may determine that the acknowledgment message 371 has been received, and that the wireless communication device 120 has satisfactorily received the MiCri data in the form of the first HARQ block 351. That is, the base station 110 may determine that the wireless communication device 120 has received the MiCri data in compliance with the high reliability and low latency requirements. At this point, no further action with respect to communication of the requested MiCri data is necessary, and the method ends at step 426.

On the other hand, at step 418, the base station 110 may determine that the negative acknowledgment message 371 has been received and that the wireless communication device 120 has not satisfactorily received the requested MiCri data. That is, the base station 110 may determine that the wireless communication device 120 has not received the MiCri data in compliance with the high reliability and low latency requirements. The base station 110 may then decode the negative acknowledgment message 371 to receive the included information regarding the interference pattern.

At step 420, the base station 110 may transmit another grant message 362 to the wireless communication device 120 during a thin-TTI of the downlink control carrier component 302. The grant message 362 may include information indicating that the negative acknowledgment message 371 was received, and that, in response to the same, a second HARQ block 352 that takes into account the information regarding the interference pattern is to be transmitted. The grant message 362 may also include information regarding the data carrier component over which the second HARQ block 352 is to be transmitted.

At step 422, the base station 110 may transmit the second HARQ block 352 during a thin-TTI of the present nominal TTI 342 of the second data carrier component 340, as shown in FIG. 3. As discussed above, the transmission of the second HARQ block 352 takes into account the information regarding the interference pattern received with the negative acknowledgment message 371. The base station 110 may transmit the second HARQ block 352 substantially simultaneously along with the grant message 362 transmitted in step 420. For example, the base station 110 may transmit the second HARQ block 352 during a thin-TTI of the present nominal TTI 342 that corresponds in time with the thin-TTI of the downlink control carrier component 302 during which the grant message 362 is transmitted.

At step 424, the base station 110 should receive an acknowledgment message 372 from the wireless communication device 120 indicating that the wireless communication device 120 has satisfactorily received the MiCri data in the form of the second HARQ block 352. The base station 110 may receive this acknowledgment message 372 over the uplink control carrier component 301. The method proceeds to step 416.

At step 416, base station 110 determines that the acknowledgment message 372 has been received, and that the wireless communication device 120 has satisfactorily received the MiCri data in the form of the second HARQ block 352. That is, the base station 110 determines that the wireless communication device 120 has received the MiCri data in compliance with the high reliability and low latency requirements. At this point, no further action with respect to communication of the requested MiCri data is necessary, and the method ends at step 426.

As can be appreciated, the base station 110 may be able to transmit the MiCri data immediately in response to the received request message due to providing, as an alternate first data carrier component 330, the second data carrier component 340 having nominal TTIs 341, 342, 343 staggered in time with respect to the nominal TTIs 331, 332 of the first data carrier component. That is, the addition of the second data carrier component 340 provides the base station 110 with flexibility in immediately scheduling the transmission of the MiCri data during the appropriate nominal TTI to allow satisfactory communication of the MiCri data. In this way, any scheduling delays while communicating the MiCri data may be reduced and the MiCri data may be communicated in compliance with the high reliability and low latency requirements.

According to various aspects of the present disclosure, the HARQ blocks 351, 352 may be transmitted during the thin-TTIs of the nominal TTI 342 by superimposing the MiCri data on the non-MiCri data transmitted during these thin-TTIs. That is, based on the available bandwidth during these thin-TTIs, the MiCri data and non-MiCri data may be transmitted during a common thin-TTI, with priority being given to transmission of the MiCri data. Further, according to various aspects of the present disclosure, any non-MiCri data previously scheduled to be transmitted over the second data carrier component during the thin-TTIs that are instead used to transmit the HARQ blocks may be scheduled to be transmitted during corresponding (in time) thin-TTIs of the first data carrier component. In addition, according to various aspects of the present disclosure, any non-MiCri data that is scheduled to be transmitted during the next nominal TTI of the first data carrier component may be scheduled to be transmitted immediately during the present nominal TTI of the second data carrier component. For example, when a request for non-MiCri data is received during an earlier part of the present nominal TTI of the first data carrier component, the base station 110 may have to wait to transmit the requested non-MiCri data until the next nominal TTI of the first data carrier component because the requested non-MiCri data is not given transmission priority. However, this non-MiCri data may be transmitted during the present nominal TTI of the second data carrier component. As can be appreciated, the immediate scheduling of the non-MiCri data during the present nominal TTI of the second data carrier component avoids delaying transmission of the non-MiCri data until the next nominal TTI of the first data carrier component.

According to various aspects of the present disclosure, the base station may use an approach involving pre-reporting of the interference pattern experienced by the wireless communication devices to allow for communication of the MiCri data in compliance with the high reliability and low latency requirements. In this approach, the base station may transmit a reference signal and receive information regarding the interference patterns observed by various wireless communication devices in advance to accommodate request messages that are received with fewer than the predetermined threshold number of thin-TTIs remaining in the present nominal TTI. This approach provides the advantage of being able to use a single data carrier component and of being able to satisfactorily transmit the MiCri data via transmission of a single HARQ block. Further, the base station is able to satisfactorily transmit the MiCri data to a wireless communication device regardless of the timing of receipt of the request message during a present nominal TTI.

Figure 5:
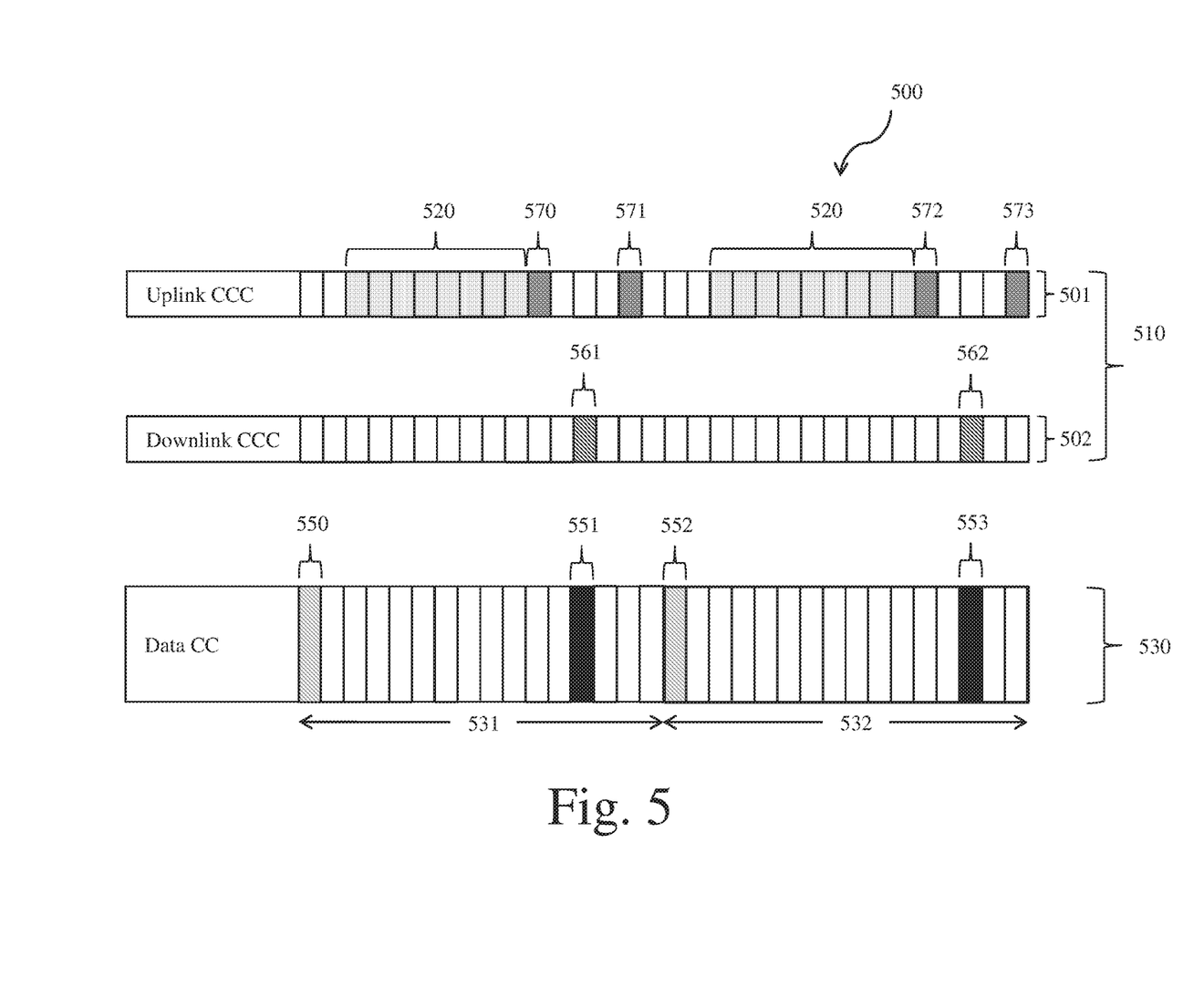
FIG. 5 illustrates an exemplary configuration 500 of a communication network according to an aspect of the present disclosure.

FIG. 5 illustrates an exemplary configuration of a communication network 500 according to various aspects of the present disclosure. As shown in FIG. 5, the communication network 500 includes base stations 110 and wireless communication devices 120 in communication with each other. For example, the wireless communication devices 120 may transmit control data to the base stations 110 over thin-TTIs of the uplink control carrier component 501, and the base stations 110 may transmit control data to the wireless communication devices 120 over thin-TTIs of the downlink control carrier component 502. Further, the base stations 110 may transmit user data, including MiCri data, to the wireless communication devices 120 over the data carrier component 530. The data carrier component 530 includes nominal TTIs 531, 532.

Figure 6:
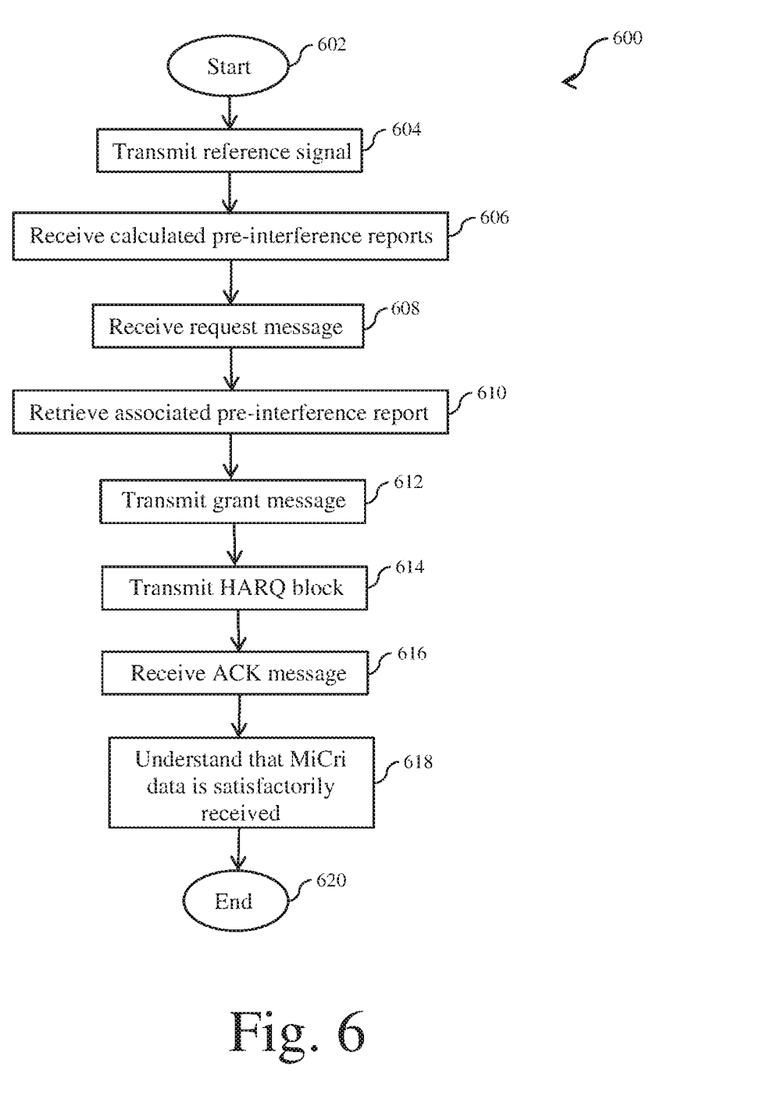
FIG. 6 illustrates a method 600 according to an aspect of the present disclosure.

A method according to an aspect of the present disclosure in accordance with the approach involving pre-reporting of the interference pattern will now be described. FIG. 6 illustrates a method 600 utilizing the network configuration 500 of FIG. 5 according to an aspect of the present disclosure. The method starts at step 602.

At step 604, during a thin-TTI of the present nominal TTI 531, a base station 110 may transmit a reference signal 551 to those wireless communication devices 120 that may be involved in mission-critical applications. Alternatively, the base station 110 may transmit the reference signal 551 to all wireless communication devices in communication with the base station 110. The reference signal 551 may include information to allow the wireless communication devices 120 to calculate the respective interference patterns experienced by the various wireless communication devices 120 during the duration of the present nominal TTI 531. For example, the reference signal 551 may include a null tone, pilot data, and/or a test signal. The base station 110 may transmit the reference signal 551 at or near the beginning of the present nominal TTI 531. According to an aspect of the present disclosure, the base station 110 may transmit the reference signal 551 during the first thin-TTI of the present nominal TTI 531.

At step 606, the base station 110 may commence receiving calculated information regarding the respective interference patterns 520 experienced by the various wireless communication devices 120 during the present nominal TTI 531. This calculated information may be received in the form of pre-interference reports and may include carrier component conditions and/or interference patterns experienced from communication activity of neighboring base stations and wireless communication devices. A pre-interference report may include information similar to the information regarding interference patterns discussed above with respect to FIGS. 3 and 4. The base station 110 may receive the pre-interference reports during the thin-TTIs of the uplink control carrier component 501. For example, the base station 110 may receive a respective pre-interference report from each of the wireless communication devices 120 during respective thin-TTIs of the uplink control carrier component 501. In that regard, one or more wireless communication devices 120 may be assigned to respective thin-TTIs for timing purposes. The base station 110 may store all the received pre-interference reports in a local memory.

At step 608, the base station 110 receives a request message 570 from a wireless communication device 120 requesting MiCri data. The base station 110 may receive the request message over a thin-TTI of the uplink control carrier component 501.

At step 610, in response to receiving the request message 570, the base station 110 may retrieve, from the local memory, the pre-interference report associated with the wireless communication device 120 that transmitted the request message 570. The base station 110 may then decode the retrieved pre-interference report to receive the included calculated information regarding the interference pattern experienced by the MiCri-requesting wireless communication device 120 during the present nominal TTI 531.

At step 612, the base station 110 transmits a grant message 561 to the wireless communication device 120 during a thin-TTI of the downlink control carrier component 502. The grant message 561 may include information indicating to the wireless communication device 120 that the request for the MiCri data has been granted. The grant message 561 may also include information regarding the data carrier component 530 over which the MiCri data is to be transmitted.

At step 614, the base station 110 may transmit requested MiCri data in the form of a single HARQ block 551 during the next thin-TTI of the present nominal TTI 531. The base station 110 may transmit the first HARQ block 551 substantially simultaneously or along with the grant message 561 transmitted in step 612. For example, the base station 110 may transmit the first HARQ block 551 during a thin-TTI of the present nominal TTI 531 that corresponds in time with the thin-TTI of the downlink control carrier component 502 during which the grant message 561 is transmitted. Alternatively, the first HARQ block 351 may be transmitted during a thin-TTI that does not correspond in time with the thin-TTI during which the grant message 361 is transmitted. The transmission of the single HARQ block 551 takes into account the information regarding the interference pattern retrieved from the pre-interference report in step 610. In this way, the base station 110 ensures satisfactory transmission of MiCri data because the transmission of the single HARQ block 551 already takes into account the interference pattern experienced by the wireless communication device 120 during the present nominal TTI 531.

At step 616, the base station 110 should receive an acknowledgment message 571 from the wireless communication device 120 indicating that the wireless communication device 120 has satisfactorily received the MiCri data in the form of the single HARQ block 551. The base station 110 may receive this acknowledgment message 571 over the uplink control carrier component 501.

At step 618, the base station 110 determines that the acknowledgment message 571 has been received, and that the wireless communication device 120 has satisfactorily received the MiCri data in the form of the single HARQ block 551. That is, the base station 110 determines that the wireless communication device 120 has received the MiCri data in compliance with the high reliability and low latency requirements. At this point, no further action with respect to communication of the requested MiCri data is necessary, and the method ends at step 620.

As can be appreciated, due to the approach of receiving pre-interference reports, the base station 110 may be able to transmit the MiCri data immediately in response to the received request message. This reduces the scheduling delay in communicating the MiCri data and also ensures that the MiCri data is communicated in compliance with the high reliability and low latency requirements. This approach also provides the advantage of being able to use a single data carrier component and of being able to satisfactorily transmit the MiCri data via transmission of a single HARQ block. Finally, the base station is able to satisfactorily transmit the MiCri data to a wireless communication device regardless of the timing of receipt of the request message during a present nominal TTI.

According to various aspects of the present disclosure, the single HARQ block 551 may be transmitted during the thin-TTI of the nominal TTI 531 by superimposing the MiCri data on the non-MiCri data transmitted during this thin-TTI. That is, based on the available bandwidth during the thin-TTI, the MiCri data and non-MiCri data may be transmitted during the thin-TTI, with priority being given to transmission of the MiCri data. For example, the base station 110 may transmit the single HARQ block 551 by completely utilizing the bandwidth available during the thin-TTI. Alternatively, the base station 110 may transmit the single HARQ block 551 by utilizing a fraction of the bandwidth available during the thin-TTI. According to various aspects of the present disclosure, the non-MiCri data that was previously scheduled to be transmitted during the thin-TTI of the nominal TTI 531, which is now used to transmit the single HARQ block 551, may be scheduled to be transmitted during the next available thin-TTI of the present nominal TTI 531.

The base station 110 may continue applying the pre-interference report approach in the next nominal TTI 532, as shown in FIG. 5. In this case, the base station 110 may receive the request message 572, may transmit the grant message 562 and a first HARQ block 553, and may receive the acknowledgment message 573, as discussed above. Alternatively, when the base station 110 expects to receive a request message during an earlier part of the next nominal TTI 532, the base station 110 may apply the approach discussed above with respect to FIG. 2.

Figure 7:
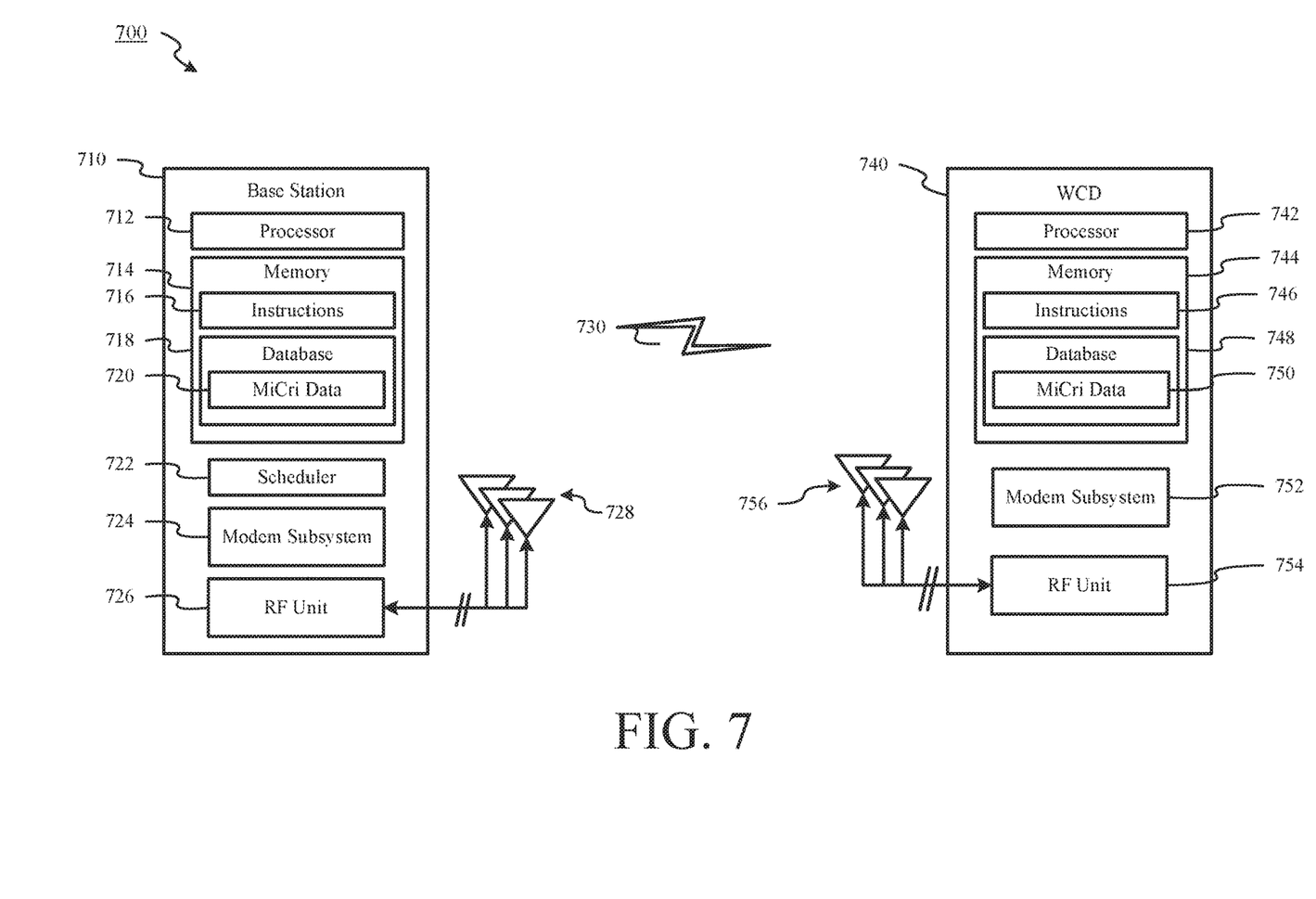
FIG. 7 illustrates a block diagram of an exemplary system 700 for communicating MiCri data according to various aspects of the present.

FIG. 7 illustrates a block diagram of an exemplary system 700 for communicating MiCri data in accordance with various aspects of the present disclosure. As shown in FIG. 7, the system 700 includes a base station 710 and a wireless communication device 740. The base station 710 and the wireless communication device 740 may be communicatively coupled via a wireless connection according to one or more protocols (e.g., a $3^{rd}$ generation (3G) protocol, an 802.11 protocol, an 802.15 protocol, a long term evolution (LTE) protocol, a $5^{th}$ generation (5G) protocol, etc.). The illustrated base station 710 may be the previously discussed base stations 110a, 110b, 110c, and the illustrated wireless communication device (WCD) may be the previously discussed wireless communication devices 120.

The wireless communication device 740 may be a mobile communication device (e.g., a smartphone, a cellular telephone, a personal digital assistant, etc.), a tablet computing device, a laptop computing device, a vehicle, a gaming console, a machine, a personal computing device, an e-reader device, a sensor device, another electronic device, or a combination of these devices that is operable to perform the operations described herein with respect to the wireless communication device 740. The wireless communication device 740 may include a processor 742, a memory 744, a modem subsystem 752, a radio frequency (RF) unit 754, and antenna elements 756. The RF unit 756 may be configured to process (e.g., perform analog to digital conversion, power amplification, etc.) of transmissions received via the antenna elements 756 (e.g., transmissions between the base station 710 and the wireless communication device 740) and the modem subsystem 752 may be configured to demodulate and/or decode the transmissions. Additionally, the modem subsystem 752, the RF unit 756, and the antenna elements 756 may also be used for transmissions originating from the wireless communication device 740 (e.g., uplink transmissions). The processor 742 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein with reference to the wireless communication device 740 in connection with FIG. 7.

The memory 744 may include a cache memory (e.g., a cache memory of the processor 742), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. The memory 744 may store instructions 746 and a database 748. The database 748 may include MiCri data information 750. The MiCri data information 750 may include all or some of the types of information described in connection with the MiCri data information 720 below. However, the MiCri data information 750 may be specific to the wireless communication device 740, whereas the MiCri data information 720 may be associated with multiple difference types and/or configurations of mobile devices. The instructions 746 may include instructions that, when executed by the processor 742, cause the processor 742 to perform the operations described herein with reference to the wireless communication device 740 in connection with FIGS. 1-7.

The base station 710 may be an evolved Node B (eNodeB) (e.g., one of the eNodeBs 110 of FIG. 1), a macro cell (e.g., one of the macro cells 102a, 102b, 102c of FIG. 1), a pico cell, a femto cell, a relay station, an access point, or another electronic device operable to perform the operations described herein with respect to the base station 710. The base station 710 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

As shown in FIG. 7, the base station 710 includes a processor 712, a memory 716, a scheduler 722, a modem subsystem 724, a radio frequency (RF) unit 726, and antenna elements 728. The processor 712 may include a CPU, a DSP, an ASIC, a controller, a FPGA device, another hardware device, a firmware device, or any combination thereof configured to perform the operations described herein with reference to the base station 710 in connection with FIGS. 1-7. The RF unit 726 may be configured to process (e.g., perform digital to analog conversion, power amplification, etc.) of transmissions originating from the base station 710 that may be transmitted via the antenna elements 728 (e.g., transmissions between the base station 710 and the wireless communication device 740) and the modem subsystem 724 may be configured to modulate and/or encode the transmissions according to a modulation and coding scheme (MCS), as described in more detail below. Additionally, the modem subsystem 724, the RF unit 726, and the antenna elements 728 may also be used for receiving transmissions originating from the wireless communication device 740 (e.g., uplink transmissions).

The memory 714 may include a cache memory (e.g., a cache memory of the processor 412), RAM, MRAM, ROM, PROM, EPROM, EEPROM, flash memory, a solid state memory device, one or more hard disk drives, other forms of volatile and non-volatile memory, or a combination of different types of memory. The memory 714 may store instructions 716. The instructions 716 may include instructions that, when executed by the processor 712, cause the processor 712 to perform operations described in connection with FIGS. 1-7 of the present disclosure.

The memory 714 may store a database 718. In an aspect, the database 718 may be stored external to the base station 710. For example, the database 718 may be stored at memory device accessible to the base station 710 via a network, such as a backhaul network of a wireless communication system in which the base station 710 is operating. As another example, the base station 710 may be a pico cell or a femto cell operating within a coverage area provided by a macro cell (e.g., the macro cell 102b or the macro cell 102c, respectively), and the database 718 may be stored at a memory of the macro cell. In this example, the database 718 may be accessible via a connection (e.g., a wired or wireless connection) between the base station 710 and the macro cell.

The database 718, whether stored at the memory 714 or at another location accessible to the base station 710, may store MiCri data information 720. The MiCri data information 720 may include information associated with the wireless communication device 740 and/or other mobile devices. The MiCri data information 720 may include information associated with one or more parameters that may be used to configure a transmission between the base station 710 and the wireless communication device 740. The one or more parameters may include at least one parameter that affects an amount of MiCri data communicated by the wireless communication device 740. The MiCri data information 720 may be respectively constructed for each different wireless communication device 740 (e.g., per SKU of the wireless communication device 740). To illustrate, the wireless communication device 740 may support decoding of transmissions using one or more modulation and coding schemes (MCSs) (e.g., a low-density parity check (LDPC) coding scheme, a turbo coding scheme, a convolutional coding scheme, etc.), one or more transmission modes (e.g., single layer transmissions, multilayer transmissions, single user multiple-input multiple-output (SU-MIMO), multi-user multiple-input multiple-output (MU-MIMO), transmit diversity, beamforming, etc.), one or more carrier aggregation (CA) schemes, one or more duplex modes (e.g., time division duplexing (TDD) and/or frequency division duplexing (FUD)), one or more UE categories, one or more interference management techniques (e.g., enhanced inter-cell interference coordination (eICIC), network assisted interference cancellation (NAIC), etc.), one or more frame structures, other capabilities of the wireless communication device 740, or a combination thereof. Each of these capabilities of the wireless communication device 740 may be used by the base station 710 to configure the transmissions between the base station 710 and the wireless communication device 740, and the energy consumed by the wireless communication device 740 for processing the transmissions may vary based on the parameters selected by the base station 710 for configuring the transmissions between the base station 710 and the wireless communication device 740.

In an aspect, the scheduler 722 may configure at least a portion of the transmission between the base station 710 and the wireless communication device 740. For example, the scheduler 722 may configure transmission between the base station 710 and the wireless communication device 740 based on an amount of data available in a data buffer for transmission. The scheduler 722 may configure the transmission between the base station 710 and the wireless communication device 740 per symbol period, subframe basis or frame basis. For example, the scheduler 722 may schedule the transmission using a number of resource blocks. The number of resource blocks scheduled for the transmission may be determined based at least in part on the identified energy metric. Configuring the transmission between the base station 710 and the wireless communication device 740 may include determining a transport block size to be used for the transmission between the base station 710 and the wireless communication device 740. The transport block size may be determined based at least in part on the energy metric. In an aspect, the scheduler 722 may schedule the transmission based at least in part on the transport block size.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, the method comprising:
    transmitting, from a first device, a reference signal to a second device during a first transmission time interval (TTI) of a carrier component;
    receiving, at the first device, an indication of an interference pattern experienced by the second device for a duration of the first TTI, the indication being based on the reference signal;
    receiving, at the first device, a request for mission-critical (MiCri) data; and
    transmitting, from the first device, the MiCri data to the second device during the first TTI of the carrier component using a hybrid automated repeat request (HARM) block based on the indication and a determination that a remaining time period within the first TTI after receiving the request does not exceed a predetermined threshold.

2. The method according to claim 1, wherein the transmitting the reference signal includes transmitting the reference signal at a beginning of the first TTI.

3. The method according to claim 1, wherein the transmitting the reference signal includes transmitting a null tone.

4. The method according to claim 3, wherein the transmitting the null tone includes transmitting the null tone at a beginning of the first TTI.

5. The method according to claim 1, wherein the transmitting the reference signal includes transmitting a pilot or a test signal.

6. The method according to claim 1, wherein the transmitting the MiCri data includes transmitting the MiCri data such that a target error rate associated with transmission of the MiCri data is satisfied.

7. The method according to claim 1, further comprising:
    transmitting a message indicating the transmission of the MiCri data to the second device, wherein
    the transmitting the MiCri data includes transmitting the MiCri data along with the message.

8. The method according to claim 1, wherein the transmitting the HARQ block includes transmitting a single HARQ block by completely utilizing an available bandwidth of the carrier component.

9. The method according to claim 1, wherein the transmitting the HARQ block includes transmitting a single HARQ block utilizing a portion of an available bandwidth of the carrier component.

10. A method for wireless communication, the method comprising:
receiving, from a first device at a second device, a reference signal during a first transmission time interval (TTI) of a carrier component;
transmitting, from the second device, an indication of an interference pattern experienced by the second device based on the reference signal;
transmitting, from the second device, a request for mission-critical (MiCri) data; and
receiving, at the second device, the MiCri data from the first device during the first TTI of the carrier component using a hybrid automated repeat request (HARQ) block based on the indication and a determination that a remaining time period within the first TTI after transmitting the request does not exceed a predetermined threshold.

11. The method according to claim 10, wherein the receiving the reference signal includes receiving the reference signal at a beginning of the first TTI.

12. The method according to claim 10, wherein the receiving the reference signal includes receiving a null tone as the reference signal.

13. The method according to claim 12, wherein the receiving the null tone includes receiving the null tone at a beginning of the first TTI.

14. The method according to claim 10, wherein the receiving the reference signal includes receiving a pilot or a test signal as the reference signal.

15. The method according to claim 10, wherein the receiving the MiCri data includes receiving the MiCri data such that a target error rate associated with reception of the MiCri data is satisfied.

16. The method according to claim 10, further comprising:
receiving a message indicating the transmission of the MiCri data from the first device, wherein
the receiving the MiCri data includes receiving the MiCri data along with the message.

17. The method according to claim 10, wherein the receiving the HARQ block includes receiving a single HARQ block that completely utilizes an available bandwidth of the carrier component.

18. The method according to claim 10, wherein the receiving the HARQ block includes receiving a single HARQ block utilizing a portion of an available bandwidth of the carrier component.

19. A base station, comprising:
a transmitter configured to transmit a reference signal to a first device during a first transmission time interval (TTI) of a carrier component; and
a receiver configured to:
receive an indication of an interference pattern experienced by the first device for a duration of the first TTI, the indication being based on the reference signal; and
receive a request for mission-critical (MiCri) data,
wherein the transmitter is configured to transmit the MiCri data to the first device during the first TTI of the carrier component using a hybrid automated repeat request (HARQ) block based on the indication and a determination that a remaining time period within the first TTI after receiving the request does not exceed a predetermined threshold.

20. The base station according to claim 19, wherein the transmitter is configured to transmit the reference signal at a beginning of the first TTI.

21. The base station according to claim 19, wherein the transmitter is configured to transmit a null tone as the reference signal.

22. The base station according to claim 21, wherein the transmitter is configured to transmit the null tone at a beginning of the first TTI.

23. The base station according to claim 19, wherein the transmitter is configured to transmit a pilot or a test signal as the reference signal.

24. The base station according to claim 19, wherein the transmitter is configured to transmit a message indicating the transmission of the MiCri data to the first device, the MiCri data being transmitted along with the message.

25. A user equipment (UE), comprising:
a receiver configured to receive a reference signal from a first device during a first transmission time interval (TTI) of a carrier component; and
a transmitter configured to:
transmit an indication of an interference pattern experienced by the UE based on the reference signal; and
transmit a request for mission-critical (MiCri) data,
wherein the receiver is configured to receive the MiCri data from the first device during the first TTI of the carrier component using a single hybrid automated repeat request (HARQ) block based on the indication and a determination that a remaining time period within the first TTI after transmitting the request does not exceed a predetermined threshold.

26. The user equipment according to claim 25, wherein the receiver is configured to receive the reference signal at a beginning of the first TTI.

27. The user equipment according to claim 25, wherein the receiver is configured to receive a null tone as the reference signal.

28. The user equipment according to claim 27, wherein the receiver is configured to receive the null tone at a beginning of the first TTI.

29. The user equipment according to claim 25, wherein the receiver is configured to receive a pilot or a test signal as the reference signal.

30. The user equipment according to claim 25, wherein the receiver is configured to receive a message indicating the transmission of the MiCri data from the first device, the MiCri data received along with the message.

* * * * *